(12) United States Patent
Iwasaki et al.

(10) Patent No.: US 7,352,922 B2
(45) Date of Patent: Apr. 1, 2008

(54) OPTICAL DEVICE AND METHOD FOR PRODUCING SAME

(75) Inventors: Yasunori Iwasaki, Nishikasugai-Gun (JP); Akiyoshi Ide, Kasugai (JP); Ryuji Tanabe, Konan (JP)

(73) Assignees: NGK Insulators, Ltd., Nagoya (JP); NGK Optoceramics Co., Ltd., Komaki (JP)

( * ) Notice: Subject to any disclaimer, the term of this patent is extended or adjusted under 35 U.S.C. 154(b) by 0 days.

(21) Appl. No.: 11/323,974

(22) Filed: Dec. 30, 2005

(65) Prior Publication Data

US 2006/0110121 A1 May 25, 2006

Related U.S. Application Data

(63) Continuation of application No. PCT/JP2004/009836, filed on Jul. 9, 2004.

(30) Foreign Application Priority Data

Jul. 10, 2003 (JP) .............................. 2003-272947

(51) Int. Cl.
*G02B 6/12* (2006.01)
*G02B 6/42* (2006.01)

(52) U.S. Cl. .......................................... 385/14; 385/52

(58) Field of Classification Search ............... 385/65, 385/83, 89, 114, 132
See application file for complete search history.

(56) References Cited

U.S. PATENT DOCUMENTS 5,449,309 A * 9/1995 McCarty ....................... 441/69

| | | | | |
|---|---|---|---|---|
| 6,406,196 B1 * | 6/2002 | Uno et al. | ..................... | 385/89 |
| 7,123,798 B2 * | 10/2006 | Fukuyama et al. | ........... | 385/49 |
| 7,174,062 B2 * | 2/2007 | Fukuyama et al. | ........... | 385/14 |
| 2003/0044102 A1 * | 3/2003 | Hasui et al. | .................. | 385/11 |
| 2003/0095756 A1 * | 5/2003 | Tohgoh et al. | ................ | 385/88 |
| 2003/0138223 A1 * | 7/2003 | Sasaki et al. | ................. | 385/93 |
| 2003/0142946 A1 * | 7/2003 | Saito et al. | ................. | 385/137 |
| 2003/0152343 A1 * | 8/2003 | Yamada et al. | ............... | 385/99 |
| 2004/0197052 A1 * | 10/2004 | Toyoda et al. | ................ | 385/49 |

FOREIGN PATENT DOCUMENTS

| | | |
|---|---|---|
| JP | 08-184712 A1 | 7/1996 |
| JP | 10-300936 A1 | 11/1998 |
| JP | 2001-264594 A1 | 9/2001 |
| JP | 2004-045766 A1 | 2/2004 |
| WO | WO 97/06458 | 2/1997 |

* cited by examiner

*Primary Examiner*—M. R. Connelly-Cushwa
(74) *Attorney, Agent, or Firm*—Burr & Brown

(57) ABSTRACT

An optical device includes a glass substrate provided with one or more V-shaped grooves and an optical fiber array having one or more optical fibers. The optical fiber array is fixed within the V-shaped grooves of the glass substrate using a fixing adhesive. As viewed from above, a first region Z1 (i.e., the region indicated by cross-hatching) and a second region Z2 are provided on the optical fiber array, and the fixing adhesive is applied within the first region Z1. A refractive index matching resin, providing refractive index matching at least with the optical fibers, is disposed in the second region Z2, wherein the second region Z2 may be surrounded by the first region Z1.

12 Claims, 13 Drawing Sheets

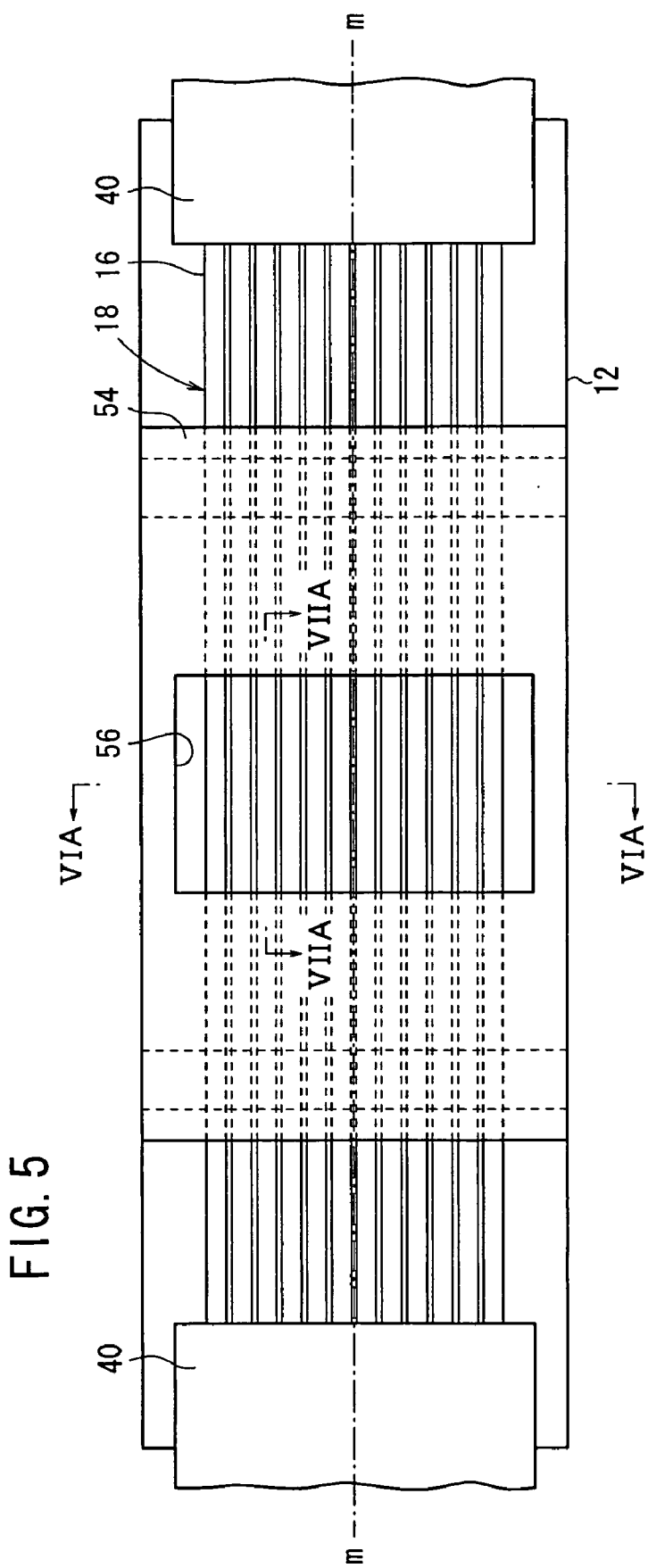

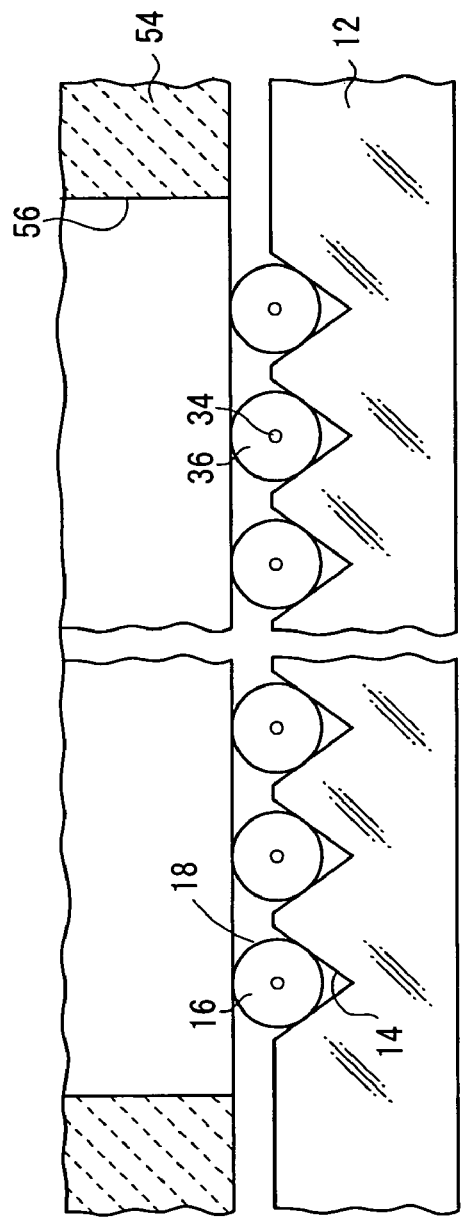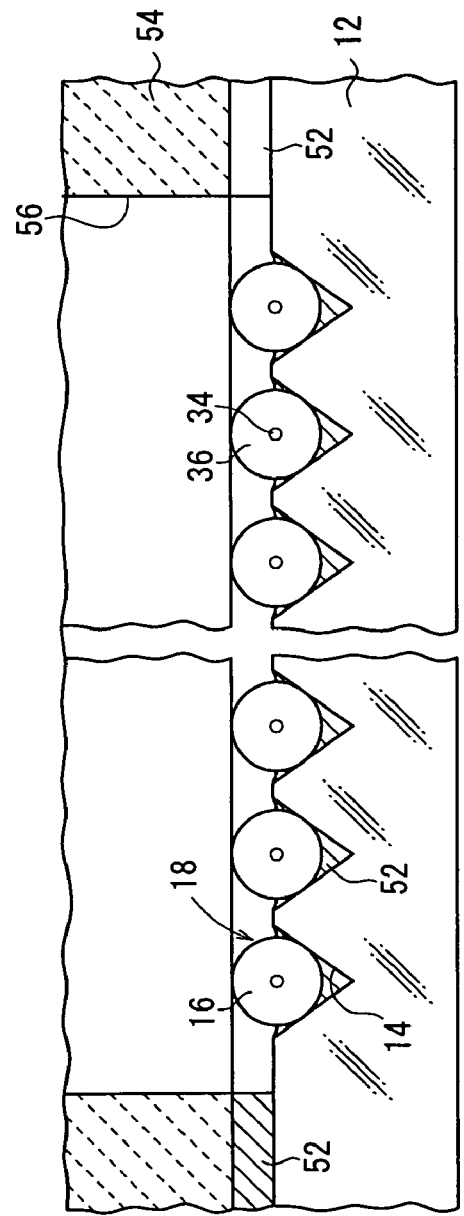
FIG. 6A
FIG. 6B

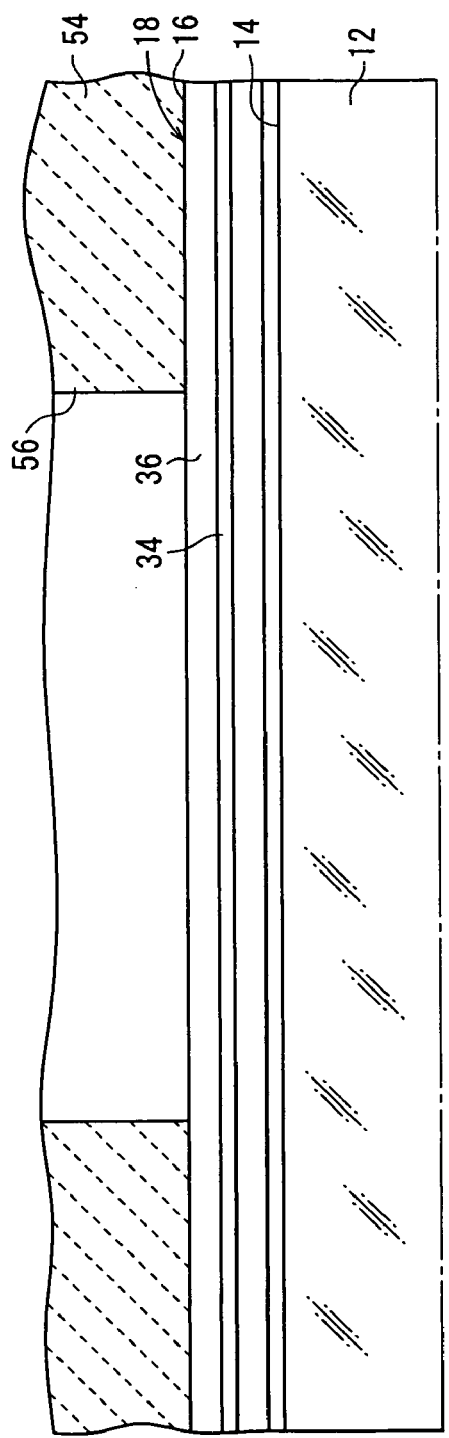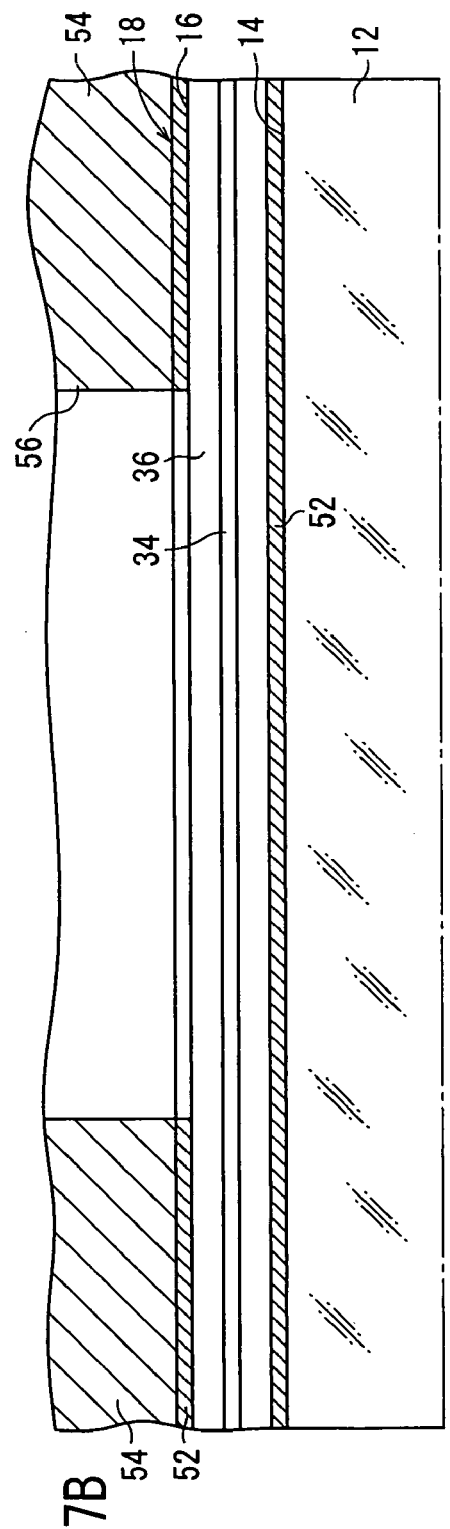
FIG. 7A
FIG. 7B

OPTICAL DEVICE AND METHOD FOR PRODUCING SAME

BACKGROUND OF THE INVENTION

1. Field of the Invention

The present invention relates to an optical device with a fixed optical fiber array having one or more optical fibers and to a method of manufacturing such an optical device, and more particularly to an optical device suitable for monitoring signal light while the signal light is propagated through an optical fiber array and to a method of manufacturing such an optical device.

2. Description of the Related Art

For present optical communication technology, it is important to monitor communication quality. Particularly, monitoring of optical output plays an important role in the field of wavelength multiplex communication technology.

In recent years, there have been growing demands for smaller size, higher performance and lower cost optical output monitoring technology.

Heretofore, a technique has been proposed and disclosed in Japanese Laid-Open Patent Publication No. 2001-264594, for example. According to this proposed technique, as shown in FIG. 13, an optical fiber 202 is placed in a V-shaped groove in a glass substrate 200, and then a slit 204 is formed in the glass substrate 200 obliquely to the optical axis, in and across the optical fiber 202. A filter member 206 is inserted into the slit 204, wherein a gap therebetween is filled with an ultraviolet-curable resin (adhesive) 208. The filter member 206 has a substrate 210 and a multilayer film 212 formed on a principal surface of the substrate 210. The multilayer film 212 is designed to match the refractive index of the substrate 210 and the refractive index of the resin 208 that fills the slit 204.

When signal light 214 is propagated through the optical fiber 202, a light component (reflected light) 216 divided by the filter member 206 is extracted out of the cladding. The reflected light 216 is detected by a photodetector, for example, to monitor the signal light 214.

The structure of the optical path for applying the divided light to the photodetector greatly affects the monitored characteristics of the signal light. It is desirable to simplify the medium that exists within the optical path of the divided light.

The conventional optical device has various interfaces, which are produced by the resin provided within the slit, the cladding layer, the fixing adhesive, a further resin for achieving refractive index matching with the photodetector (i.e., a refractive index matching resin), and the light-detecting surface of the photodetector. Further, since the slit is formed obliquely, the divided light from the filter member is emitted obliquely therefrom. Therefore, a PDL (Polarization Dependent Loss) occurs.

The dependency of the PDL on the interfaces increases as the number of interfaces in the optical path of the divided light increases. Particularly, at the interface where light is emitted from the cladding layer of the optical fiber, the refractive index of the cladding layer material (i.e., glass) and the refractive index of the resin filling the optical path must be substantially equal to each other. However, since the adhesive (fixing adhesive) for securing the optical fiber within the V-shaped groove creeps onto the optical fiber during the manufacturing process, the fixing adhesive also exists inside the optical path of the divided light.

The refractive index of the fixing adhesive and the refractive index of glass differ widely from each other. Since fixing adhesives having refractive indexes close to the refractive index of glass do not exist on the market, it is difficult to equalize the refractive index within the optical path of the divided light to that of the refractive index of glass. Therefore, the PDL undesirably increases.

Furthermore, since the spot diameter of the divided light increases depending on the distance of the optical path, the distance from the optical fiber to the photodetector should be reduced in order to increase the light detection efficiency of the photodetector. However, the fixing adhesive within the optical path of the divided light makes it difficult to reduce the distance from the optical fiber to the photodetector.

One approach would be to remove the fixing adhesive that has crept onto the optical fiber. However, such a method would require a new process step for removing the fixing adhesive. Depending on how the fixing adhesive is removed, the surface of the optical fiber may become scratched, tending to increase the PDL. Also, damage to the upper surface of the optical fiber may impair reliability.

If a refractive index matching resin is provided on the optical fiber, then depending on the viscosity of the resin, the resin may flow out due to thermosetting conditions during the manufacturing process and due to aging, resulting in air being introduced into the optical path of the divided light. Such introduced air is liable to lead to failures when performing monitoring functions.

SUMMARY OF THE INVENTION

It is an object of the present invention to provide an optical device which allows a fixing adhesive and a refractive index matching resin to exist in a planar configuration on an optical fiber array. When the optical fiber array serves a monitoring function, for example, the optical device does not have any fixing adhesive within the optical path of the divided light, thereby enhancing the monitoring function.

An optical device according to the present invention comprises a substrate having one or more V-shaped grooves defined therein and an optical fiber array having one or more optical fibers, the optical fiber array being fixed in the V-shaped grooves in the substrate by a fixing adhesive, wherein at least a first area and a second area are present on the optical fiber array as viewed from above, the fixing adhesive being present in the first area. A resin for achieving refractive index matching with at least the optical fibers may be present in the second area. At least an end face of the second area and an end face of the optical fiber array may be substantially aligned with each other.

With the above arrangement, the fixing adhesive and the refractive index matching resin are juxtaposed in a planar configuration on the optical fiber array. As a result, the fixing adhesive can be present in the area where light does not need to be extracted from a cladding layer of the optical fiber array, and the refractive index matching resin can be present in the area where light needs to be extracted from the cladding layer of the optical fiber array.

In the above structure, if an end face of the optical fiber array implements a dividing function, for dividing signal light propagated through the optical fiber array, the second area may be present in at least an optical path of divided light produced by the dividing function over the optical fiber array.

In the above structure, alternatively, if the optical fiber array implements a dividing function, for dividing signal light propagated through the optical fiber array, the second area may be present in at least an optical path of divided light produced by the dividing function over the optical fiber array. The second area may be surrounded by the first area. Even if the refractive index matching resin disposed in the second area is of low viscosity, the resin is prevented from flowing out, and air is prevented from being introduced into the optical path of the divided light.

In the optical device having a monitoring function, at the end face of the optical fiber array or within the optical fiber array itself, the fixing adhesive can be prevented from existing in the optical path of the divided light, thereby enhancing the monitoring function.

The second area as viewed from above may be of a shape that is axially symmetric with respect to a central line of the optical fiber array. The second area may have a substantially constant length entirely over the optical fiber array along an optical axis of the optical fiber array.

Alternatively, the second area may have partly different lengths along an optical axis of the optical fiber array. The second area may have different lengths associated respectively with the optical fibers along the optical axis of the optical fiber array.

According to the present invention, there is also provided a method of manufacturing an optical device comprising a substrate having one or more V-shaped grooves defined therein and an optical fiber array having one or more optical fibers, the optical fiber array being fixed in the V-shaped grooves in the substrate by a fixing adhesive, the method comprising a first step of placing the optical fiber array within the V-shaped grooves in the substrate, a second step of placing a holding down jig having a window in a portion thereof on the optical fiber array, a third step of introducing the fixing adhesive between the holding down jig, the optical fiber array, and the V-shaped grooves, and a fourth step of, after the holding down jig is removed, introducing a resin different from the fixing adhesive into an area on the optical fiber array in which entry of the fixing adhesive was inhibited by the window of the holding down jig.

The fourth step may comprise the step of introducing a resin for achieving refractive index matching with at least the optical fiber array into the area in which entry of the fixing adhesive was inhibited by the window of the holding down jig.

Specifically, when the holding down jig is placed on the optical fiber array disposed in the V-shaped grooves in the substrate, and the fixing adhesive is introduced between the holding down jig, the optical fiber array, and the V-shaped grooves, the fixing adhesive enters along a lower surface of the holding down jig due to a capillary action. Due to the window of the holding down jig, entry of the fixing adhesive onto the optical fiber array stops at the window, and the fixing adhesive does not creep over the optical fiber array directly below the window. The fixing adhesive naturally enters beneath the holding down jig regardless of whether the holding down jig has the window or not.

When the holding down jig is removed, the optical fiber array includes an area in which entry of the fixing adhesive was inhibited by the window of the holding down jig. Thereafter, in the fourth step, a resin different from the fixing adhesive is introduced into the area in which the entry of the fixing adhesive was inhibited.

The above method may further comprise, between the third step and the fourth step, a fifth step of forming a slit in a portion of the optical fiber array which corresponds to the area in which entry of the fixing adhesive was inhibited by the window of the holding down jig, and a sixth step of inserting a dividing member into the slit. The optical device thus obtained enables a monitoring function in the optical fiber array.

With the method of manufacturing the optical device according to the present invention, therefore, a fixing adhesive and a refractive index matching layer are juxtaposed in a planar configuration on the optical fiber array. As a result, for example, the fixing adhesive can be present in the area where light does not need to be extracted from a cladding layer of the optical fiber array, and the refractive index matching layer can be present in the area where light needs to be extracted from the cladding layer of the optical fiber array.

When the optical device includes a monitoring function at the end face of the optical fiber array, or within the optical fiber array itself, the fixing adhesive can be prevented from existing in the optical path of the divided light, thereby enhancing the monitoring function.

According to the present invention, there is also provided a method of manufacturing an optical device comprising a substrate having one or more V-shaped grooves defined therein and an optical fiber array having one or more optical fibers, the optical fiber array being fixed within the V-shaped grooves in the substrate by a fixing adhesive, the method comprising a first step of placing the optical fiber array in the V-shaped grooves in the substrate, a second step of placing a holding down jig on the optical fiber array with an end face thereof being exposed, and a third step of introducing a fixing adhesive between the holding down jig, the optical fiber array, and the V-shaped grooves.

When the holding down jig is placed on the optical fiber array disposed within the V-shaped grooves in the substrate, and the fixing adhesive is introduced between the holding down jig, the optical fiber array, and the V-shaped grooves, the fixing adhesive enters along a lower surface of the holding down jig due to a capillary action. Since the end face of the optical fiber array is exposed from the holding down jig, the fixing adhesive is prevented from creeping onto the end face of the optical fiber array.

Consequently, when the holding down jig is removed, an area in which the fixing adhesive is present, and another area in which the fixing adhesive is not present, are formed on the optical fiber array. If the end face of the optical fiber array is polished to form a slanted surface, and a multilayer film is formed on the slanted surface in order to provide a dividing function for signal light, then it is easy to install a PD array using a refractive index matching resin, without any need for a fixing adhesive to be disposed in the optical path of the divided light, thereby enabling a monitoring function at the end face of the optical fiber array.

With the optical device and the method of manufacturing the same according to the present invention, as described above, the fixing adhesive and the refractive index matching layer are juxtaposed in a planar configuration on the optical fiber array. As a result, when the optical fiber array has a monitoring function, the fixing adhesive can be prevented from existing in the optical path of the divided light, thereby enhancing the monitoring function.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 5 is a plan view showing the manner in which the holding down jig is placed on and pressed against the optical fiber array;

FIG. 6A is a cross-sectional view taken along line VIA-VIA of FIG. 5;

FIG. 6B is a cross-sectional view similar to FIG. 6A, showing the optical fiber array coated with a fixing adhesive;

FIG. 7A is a cross-sectional view taken along line VIIA-VIIA of FIG. 5;

FIG. 7B is a cross-sectional view similar to FIG. 7A, showing the optical fiber array coated with a fixing adhesive;

DESCRIPTION OF THE PREFERRED EMBODIMENTS

Embodiments of an optical device according to the present invention, and to a method of manufacturing the same, shall be described below with reference to FIGS. 1 through 12.

Figure 1:
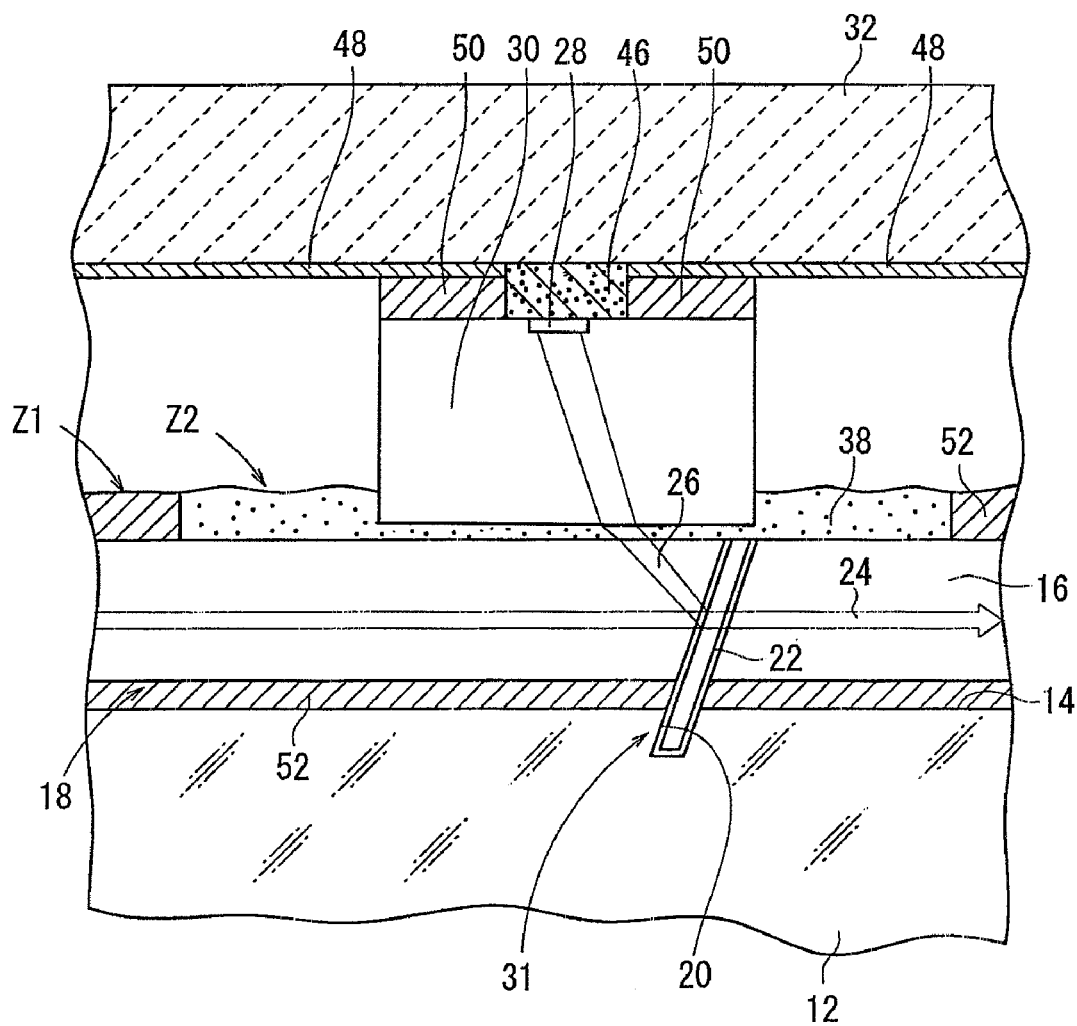
FIG. 1 is a fragmentary view of an optical device according to a first embodiment of the present invention.

As shown in FIG. 1, an optical device 10A according to a first embodiment has a glass substrate 12, an optical fiber array 18 comprising a plurality of optical fibers 16 fixed in a plurality of V-shaped grooves 14 (see FIG. 6A) defined in the glass substrate 12, a slit 20 extending from the upper surfaces of the optical fibers 16 into the glass substrate 12, a dividing member (filter member) 22 inserted in the slit 20, a PD (photodiode) array 30 having a plurality of active layers 28 for detecting light (divided light) 26 divided by at least the filter member 22, and a submount 32 which fixes the PD array 30 so as to face toward the optical fiber array 18. Two end faces of the slit 20 and front and reverse surfaces of the filter member 22 function as a dividing unit 31 for dividing a portion of the signal light 24 that passes through the optical fiber 16. As shown in FIGS. 6A and 7A, each of the optical fibers 16 comprises a core 34 and a cladding 36.

Therefore, as shown in FIG. 1, the optical device 10A according to the first embodiment of the present invention has the glass substrate 12 with V-shaped grooves 14 (see FIG. 6A) defined therein, and the optical fiber array 18 is fixed within the V-shaped grooves 14 in the glass substrate 12, with each of the optical fibers 16 having a light dividing function (the slit 20, the filter member 22, etc.). The PD array 30 is fixedly mounted by a resin for providing refractive index matching (hereinafter referred to simply as a "refractive index matching resin 38") within the optical path of divided light 26 which is generated at least by the dividing unit 31, outside of the cladding of each of the optical fibers 16. A submount 32 is provided with the PD array 30 mounted thereon, wherein the submount 32 provides a mounting surface for the PD array 30, which is disposed in confronting relation to the glass substrate 12.

Figure 4:
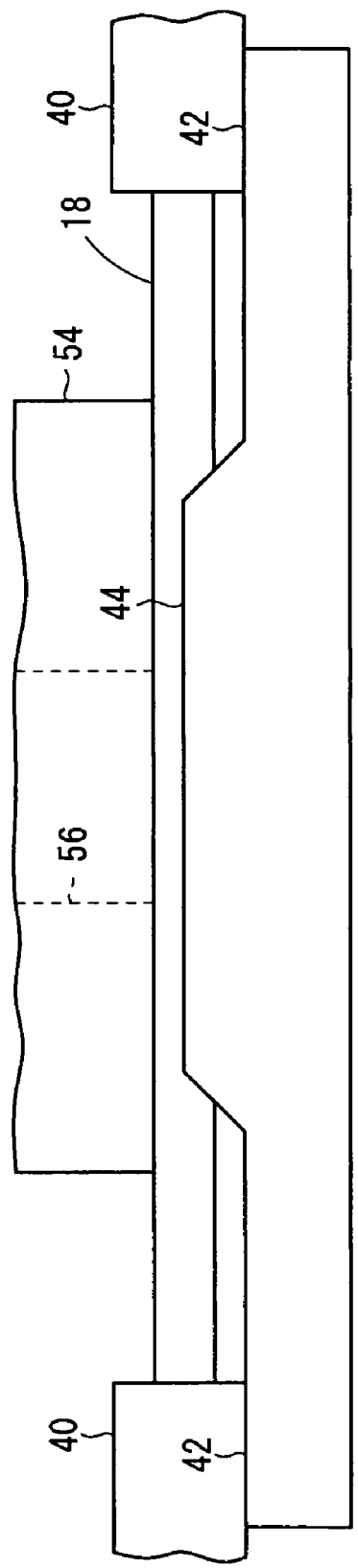
FIG. 4 is a side elevational view showing the manner in which a holding down jig is placed on and pressed against an optical fiber array.

As shown in FIG. 4, for example, the glass substrate 12 has a thin-plate portion (fiber placement portion) 42 on which a fiber sheath 40 of the optical fiber array 18 is placed, and a portion 44 where the V-shaped grooves 14 (see FIG. 6A) are defined (V-shaped groove forming portion).

As shown in FIG. 1, the PD array 30 is of a structure for detecting light applied to its reverse side. An anisotropic conductive paste 46, rather than gold solder or electrode or silver paste, is disposed upwardly of the active layers 28 (extending up to the submount 32). The region above the active layers 28 should preferably be of a material having a low reflectance, such as an anisotropic conductive paste 46, air, or the like, rather than a material with high reflectance, such as gold or the like, from the standpoint of crosstalk. Of course, the PD array 30 may be a PD array for detecting light applied to its face side.

The submount 32 is mounted in a structure, which includes the optical fibers 16, the PD array 30, and the submount 32, arranged successively. The submount 32 is made of $Al_2O_3$.

The PD array 30 for detecting light applied to its reverse side has anode electrodes and cathode electrodes, which are disposed on the surface of the active layers 28 (facing the submount 32), and a common cathode electrode and anode electrodes associated with respective channels are patterned as a gold electrode pattern 48 on the submount 32. Bumps 50 of gold are disposed in regions corresponding to the anode electrodes of respective channels, and to the cathode electrodes, and the region above the active layers 28 is filled with the anisotropic conductive paste 46. The bumps 50 of gold serve the purpose of achieving reliable conduction, and also for increasing the inter-electrode distance between the active layer 28 and the submount 32, in order to reduce stray light due to reflection and scattering within these areas. When heat is applied to the anisotropic conductive paste 46, a conductive material such as silver or the like in the anisotropic conductive paste 46 is attracted to the conductive areas, such as the bumps 50 of gold, thereby providing conductivity only between the anisotropic conductive paste 46 and the gold electrode pattern 48.

An area on the lower surface of the submount 32, which corresponds to the active layers 28, is coated with SiN (not shown) for reducing reflection due to a difference in the refractive index.

Figure 2:
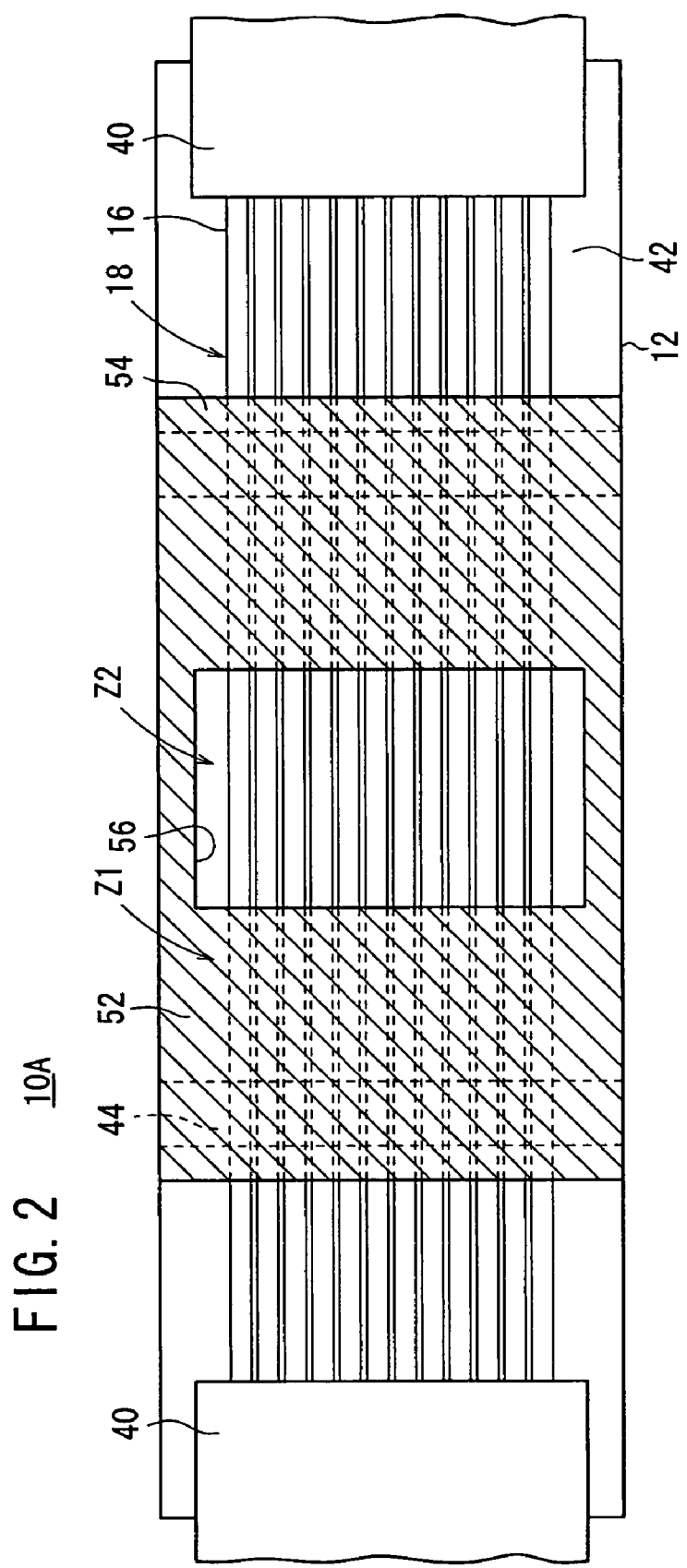
FIG. 2 is a plan view showing the optical device according to the first embodiment, which is coated with a fixing adhesive.

As shown in FIG. 2, the optical device 10A according to the first embodiment has at least a first area Z1 (shown hatched in FIG. 2), and a second area Z2 as viewed from above, on the optical fiber array 18. A fixing adhesive 52 is present within the first area Z1, and a refractive index matching resin 38 (see FIG. 1), not shown in FIG. 2, is present within the second area Z2. Over the optical fiber array 18, the second area Z2 exists at least within the optical path of the divided light 26 from the dividing unit 31, whereas the fixing adhesive 52 is not present in the optical path. The second area Z2 is surrounded by the first area Z1.

With the optical device 10A according to the first embodiment, as described above, since the fixing adhesive 52 and the refractive index matching resin 38 are juxtaposed in a planar configuration on the optical fiber array 18, the refractive index matching resin 38 can be present in an area (i.e., the second area Z2) from which the divided light 26 is extracted, and the fixing adhesive 52 can be present in another area (i.e., the first area Z1). As a result, the PDL of the divided light 26 is prevented from increasing. Furthermore, the distance from the optical fiber array 18 to the PD array 30 can easily be reduced, in order to increase the light-detecting characteristics of the PD array 30.

Since the fixing adhesive 52 on the optical fiber array 18 does not need to be forcibly removed, no extra process step is required. In addition, because the surfaces of the optical fibers 16 are not scratched, the upper surface of the optical fiber array 18 tends not to become damaged during manufacturing, resulting in process simplification, product cost reduction, and increased product reliability.

If a refractive index matching resin 38 having low viscosity is provided on the optical fiber array 18, there is a possibility that the resin 38 may tend to flow out. According to the first embodiment, since the second area Z2 in which the refractive index matching resin 38 is provided is surrounded by the first area Z1 containing the fixing adhesive 52, the refractive index matching resin 38 provided in the second area Z2, even if it has a low viscosity, does not flow out, thereby preventing air from being introduced into the optical path of the divided light 26.

A method of manufacturing the optical device 10A according to the first embodiment shall be described below with reference to FIGS. 3 through 7B.

Figure 3:
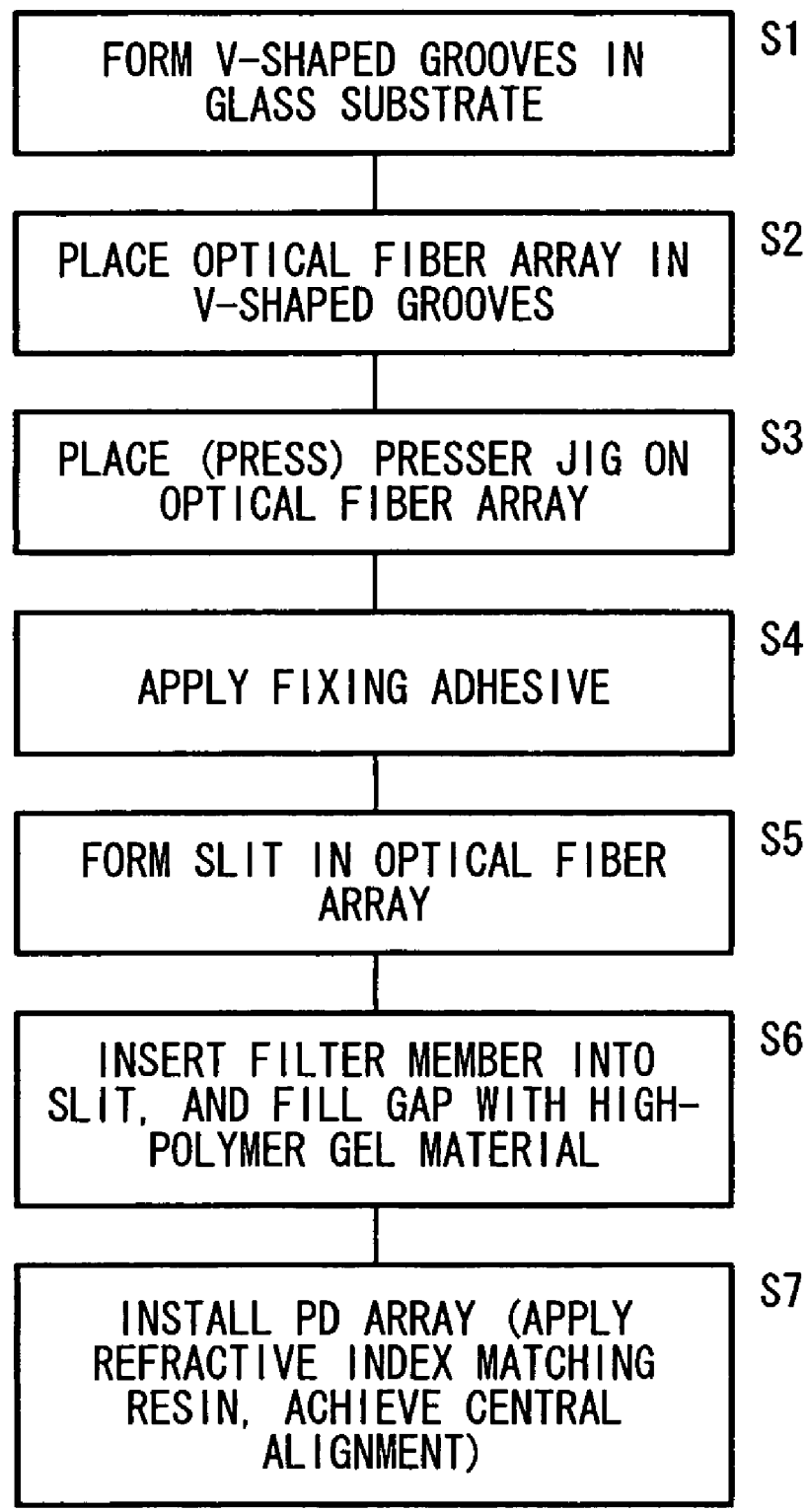
FIG. 3 is a process block diagram showing a method of manufacturing the optical device according to the first embodiment.

In step S1 shown in FIG. 3, a glass plate is ground into a glass substrate 12 having a fiber placement portion 42 and a V-shaped groove forming portion 44, as shown in FIG. 4. Thereafter, V-shaped grooves 14 (see FIG. 6A) are formed by grinding in the V-shaped groove forming portion 44 of the glass substrate 12. Thereafter, in step S2 shown in FIG. 3, the optical fiber array 18 is placed within the V-shaped grooves 14 in the glass substrate 12, as shown in FIGS. 4 and 6A.

Thereafter, in step S3 of FIG. 3, as shown in FIGS. 4, 6A, and 7A, a holding down jig 54 is placed on the optical fiber array 18. Specifically, the optical fiber array 18 is pressed against and fixed within the V-shaped grooves 14 by the holding down jig 54, using a non-illustrated weighting jig or the like. The holding down jig 54 has a window 56 defined vertically therein, through a central portion thereof. In the example shown in FIG. 5, the window 56 of the holding down jig 54 is of an elongate rectangular shape, as viewed from above.

When the optical fiber array 18 is pressed down by the holding down jig 54, as shown in FIG. 5, the window 56 has shorter sides thereof positioned outwardly, on opposite sides of the optical fiber array 18. The longer sides thereof are positioned to extend entirely across the optical fiber array 18.

In step S4 of FIG. 3, as shown in FIGS. 6B and 7B, the fixing adhesive (ultraviolet-curable adhesive) 52 is applied from longitudinally opposite sides of the holding down jig 54. At this time, the fixing adhesive 52 enters along the lower surface of the holding down jig 54, as a result of a capillary action. Since the holding down jig 54 includes the window 56, entry of the fixing adhesive 52 stops at the window 56, and the fixing adhesive 52 does not creep over the optical fiber array 18 directly below the window 56. However, the fixing adhesive 52 naturally enters beneath the holding down jig 54 regardless of whether the holding down jig 54 has the window 56 or not.

Thereafter, ultraviolet radiation is applied from above to tentatively secure the assembly. Once the assembly has been tentatively secured, the reverse surface of the optical fiber array 18 (i.e., the reverse surface of the glass substrate 12) is irradiated with ultraviolet radiation. The holding down jig 54 is then removed, and ultraviolet radiation is applied from above (i.e., to the upper surface of the optical fiber array 18), finally curing the fixing adhesive 52 with heat. In this stage, as shown in FIG. 2, the first area Z1 in which the fixing adhesive 52 is present, and the second area Z2 in which the fixing adhesive 52 is not present, are simultaneously formed on the optical fiber array 18.

Thereafter, in step S5 of FIG. 3, as shown in FIG. 1, a slit 20 is formed in an area of the optical fiber array 18 in which the fixing adhesive 52 is not disposed (i.e., the area where the window 56 of the holding down jig 54 was formerly positioned, that is, the second area Z2).

The slit 20 should desirably have a width within a range of 5 to 50 μm. If the width of the slit 20 is smaller than 5 μm, then the member (filter member 22) to be inserted into the slit 20 becomes too thin to be mounted with ease. If the width of the slit 20 is greater than 50 μm, then an excessive loss becomes too large, to an extent that actual specifications for the device cannot not be met.

The depth of the slit 20 should preferably be in a range of from 130 μm to 250 μm. If the depth of the slit 20 is smaller than 130 μm, then during machining, the slit may possibly terminate within the optical fibers 16, causing damage to the optical fibers 16 initially due to machining of the slot. If the depth of the slit 20 is greater than 250 μm, then the strength of the glass substrate 12 may undesirably be reduced.

The tilt angle α should preferably be in the range of from 15° to 25°. If the tilt angle α is smaller than 15°, then the PD array 30 may have impaired crosstalk (interference) characteristics, as described later. If the tilt angle α is greater than 25°, then the polarization dependency of the divided light 26 within the dividing member 31 may become impaired.

Then, the filter member 22 is fabricated. The filter member 22 has a substrate made of quartz glass. If handling, etc., of the filter member 22 is taken into account, then the filter member 22 may be made of a plastic material, a high-polymer material, or a polyimide material. However, since the filter member 22 is disposed at a large angle of 20°, the filter member 22 should preferably be made of a material having the same refractive index as the optical fibers (quartz) themselves, in order to prevent the optical axis of transmitted light from becoming displaced due to refraction. A multilayer film for dividing light is formed on the substrate of quartz glass. The filter member 22 is designed to have a tilt angle of 20° and a division ratio represented by a transmittance of 93% and a reflectance of 7%.

Thereafter, in step S6 of FIG. 3, as shown in FIG. 1, the filter member 22 is inserted into the slit 20, and the gap between the slit 20 and the filter member 22 is filled with a high-polymer gel material, not shown. The high-polymer gel material comprises a silicone-based high-polymer gel, whose refractive index is essentially the same as the refractive index of the cores 34 of the optical fibers 16 and the refractive index of the quartz glass substrate of the filter member 22.

In step S7 of FIG. 3, as shown in FIG. 1, the PD array 30 (i.e., the PD array as mounted on the submount 32) is installed on the optical fiber array 18, with the refractive index matching resin 38 interposed therebetween, thereby producing the optical device 10A according to the first embodiment. When the PD array 30 is mounted, it is adjusted for central alignment while the refractive index matching resin 38 is being applied. At this time, the second area Z2 is filled with the refractive index matching resin 38, in order to prevent the refractive index matching resin 38 from flowing out.

In the method of manufacturing the optical device, as described above, before the fixing adhesive 52 is applied, the optical fiber array 18 is pressed down by the holding down jig 54, which has the window 56 in a portion thereof. Therefore, the fixing adhesive 52 does not enter into an area directly below the window 56, and the area (i.e., the second area Z2), in which entry of the fixing adhesive 52 has been inhibited by the window 56 of the holding down jig 54, exists on the optical fiber array 18. Therefore, the fixing adhesive 52 and the refractive index matching resin 38 are juxtaposed in a planar configuration on the optical fiber array 18. As a result, the fixing adhesive 52 can be present within the first area Z1, where the divided light 26 does not need to be extracted from the claddings 36 of the optical fiber array 18, and the refractive index matching resin 38 can be present within the second area Z2, where the divided light 26 needs to be extracted from the claddings 36 of the optical fiber array 18.

Therefore, in an optical device in which the dividing unit 31 is disposed in the optical fiber array 18, such as the optical device 10A according to the first embodiment, the fixing adhesive 52 is not present within the optical path of the divided light 26, thereby enhancing its function for monitoring signal light 24.

Figure 8:
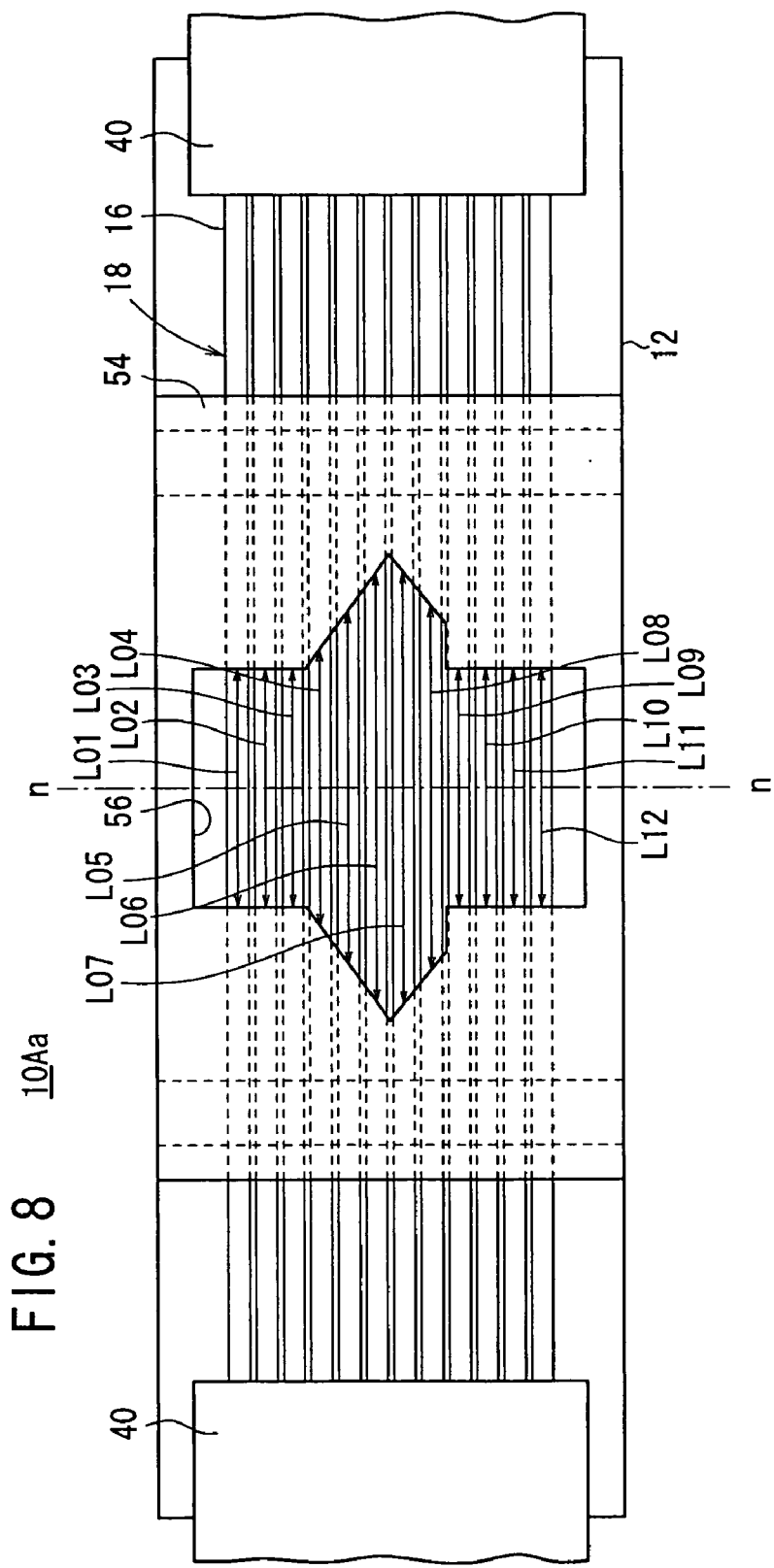
FIG. 8 is a plan view showing a first modification of the optical device according to the first embodiment.
Figure 9:
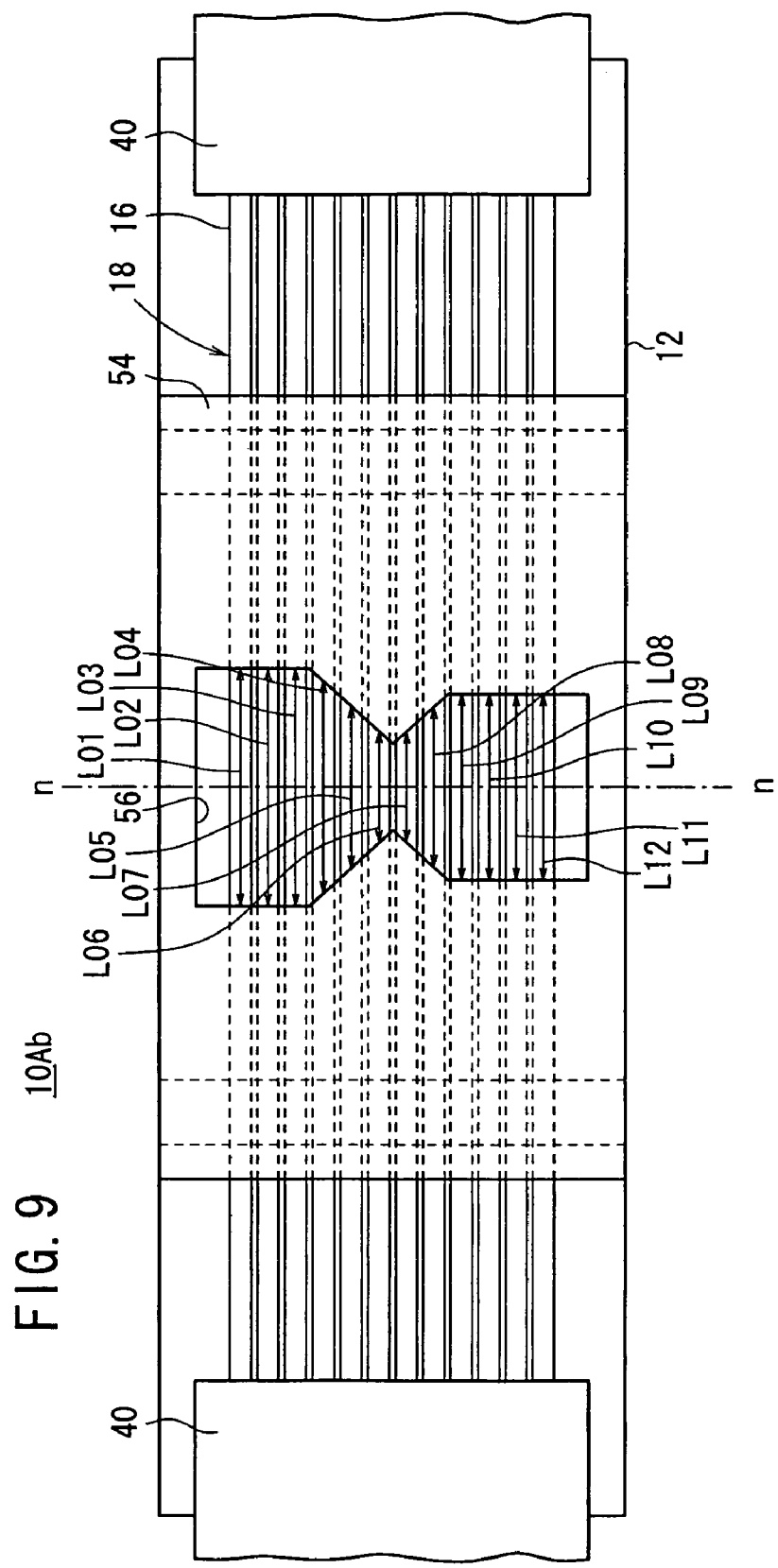
FIG. 9 is a plan view showing a second modification of the optical device according to the first embodiment.

In the above example, the second area Z2 is of an elongate rectangular shape as viewed from above. However, the second area Z2 may be of a shape having axial symmetry with respect to a central line m along the optical axis of the optical fiber array 18 (e.g., a circular shape, an elliptical shape, a track shape, a lozenge shape, etc.). Alternatively, FIGS. 8 and 9 show optical devices 10Aa, 10Ab according to first and second modifications, which have a second area Z2 having a shape of axial symmetry with respect to a central line n that is perpendicular to the optical axis of the optical fiber array 18. In the optical devices 10Aa, 10Ab according to the first and second modifications, the second area Z2 has partially different lengths along the optical axis of the optical fiber array 18.

Specifically, the optical device 10Aa according to the first modification has first through twelfth channels, which are successively arranged from above as shown in FIG. 8, and which have respective lengths L01, L02, . . . , L12, wherein such lengths are related to each other as follows:
L01=L02=L03
L03<L04<L05<L06
L07>L08>L09
L09=L10=L11=L12, and
L01=L12, L05<L08, L06<L07

As shown in FIG. 9, the optical device 10Ab according to the second modification has channel lengths related to each other as follows:
L01=L02=L03
L04>L05>L06
L07<L08<L09
L09=L10=L11=L12, and
L01>L12, L05=L08, L06=L07.

An optical device 10B according to a second embodiment shall be described below with reference to FIG. 10.

Figure 10:
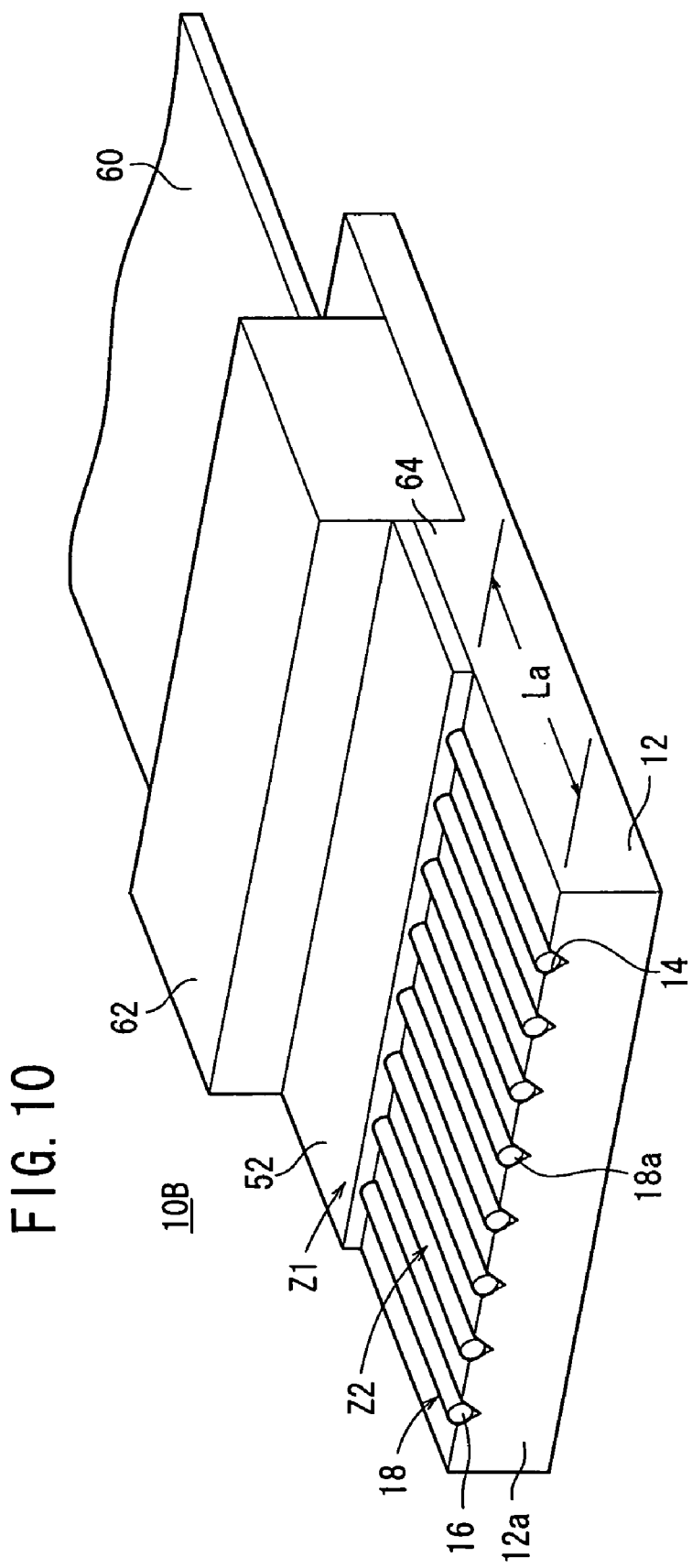
FIG. 10 is a perspective view of an optical device according to a second embodiment.

As shown in FIG. 10, the optical device 10B according to the second embodiment has a glass substrate 12, a fiber ribbon 60, and a fixing plate 62. The glass substrate 12 has an integral land 64 extending from an end face 12a thereof over a predetermined distance, with a plurality of V-shaped grooves 14 defined in the upper surface of the land 64. The fiber ribbon 60 has an end portion peeled off to expose a naked optical fiber array 18. The optical fiber array 18 includes optical fibers 16 fixedly placed respectively within the V-shaped grooves 14 in the glass substrate 12. The fixing plate 62 is fixedly placed on another portion of the glass substrate 12 apart from the land 64, for pressing and securing the fiber ribbon 60 to the glass substrate 12.

An area (first area Z1) extends over the optical fiber array 18 on the land 64 near the fixing plate 62, and contains a fixing adhesive 52 therein. Another area (second area Z2), which does not contain the fixing adhesive 52 therein, extends a predetermined distance La from an end face 18a of the optical fiber array 18, in the optical axis direction thereof.

Figure 11:
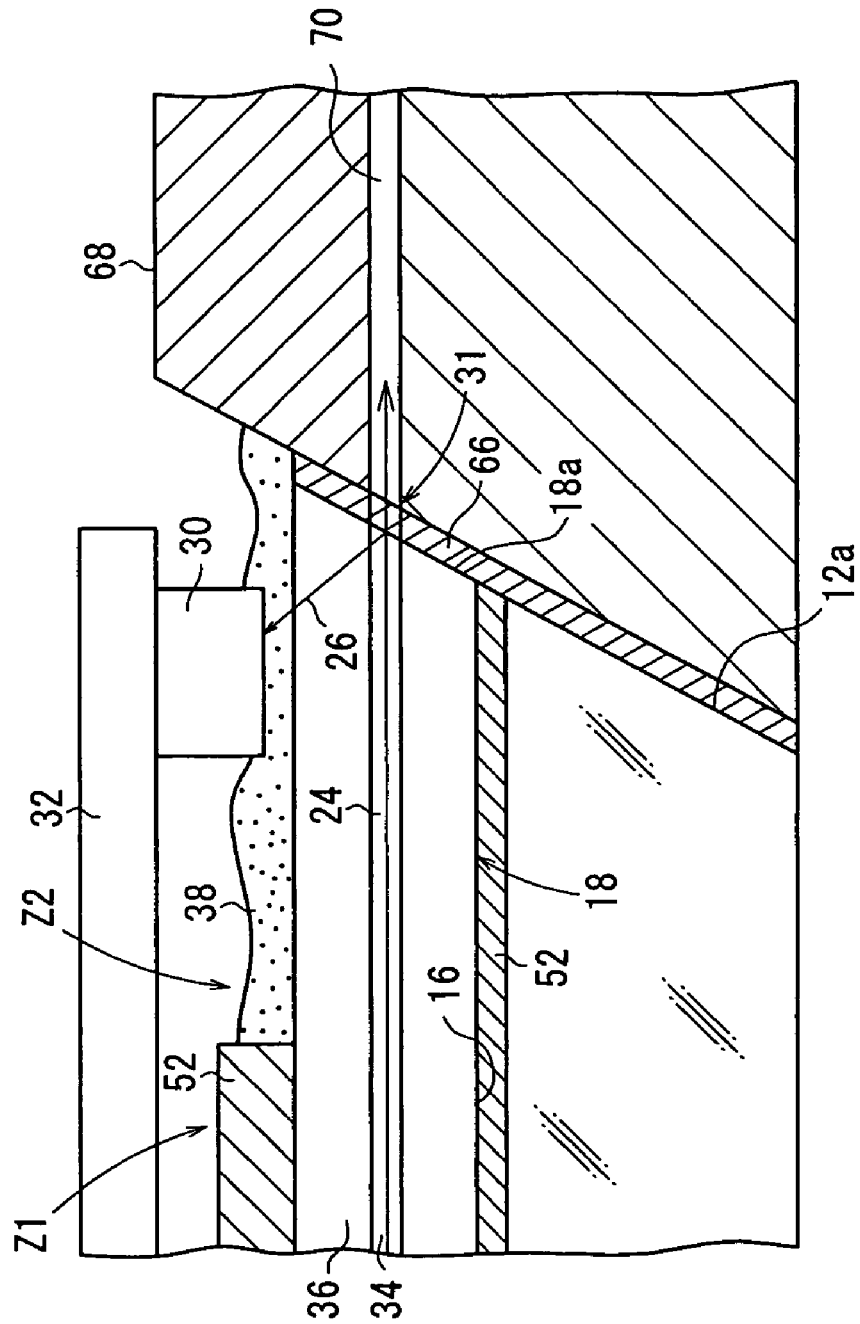
FIG. 11 is a cross-sectional view showing an example in which the optical device according to the second embodiment is used.

Subsequently, as shown for example in FIG. 11, the end face 12a of the glass substrate 12 and the end face 18a of the optical fiber array 18 are polished to produce a slanted surface, and a multilayer film 66 is formed on the slanted surface to provide a dividing unit 31. Another optical component 68, e.g., an optical waveguide 70, is optically coupled to the dividing unit 31. In this case, a PD array 30 may be easily mounted on the dividing unit 31, with a refractive index matching resin 38 interposed therebetween, for monitoring divided light at the end face 18a of the optical fiber array 18.

Figure 12:
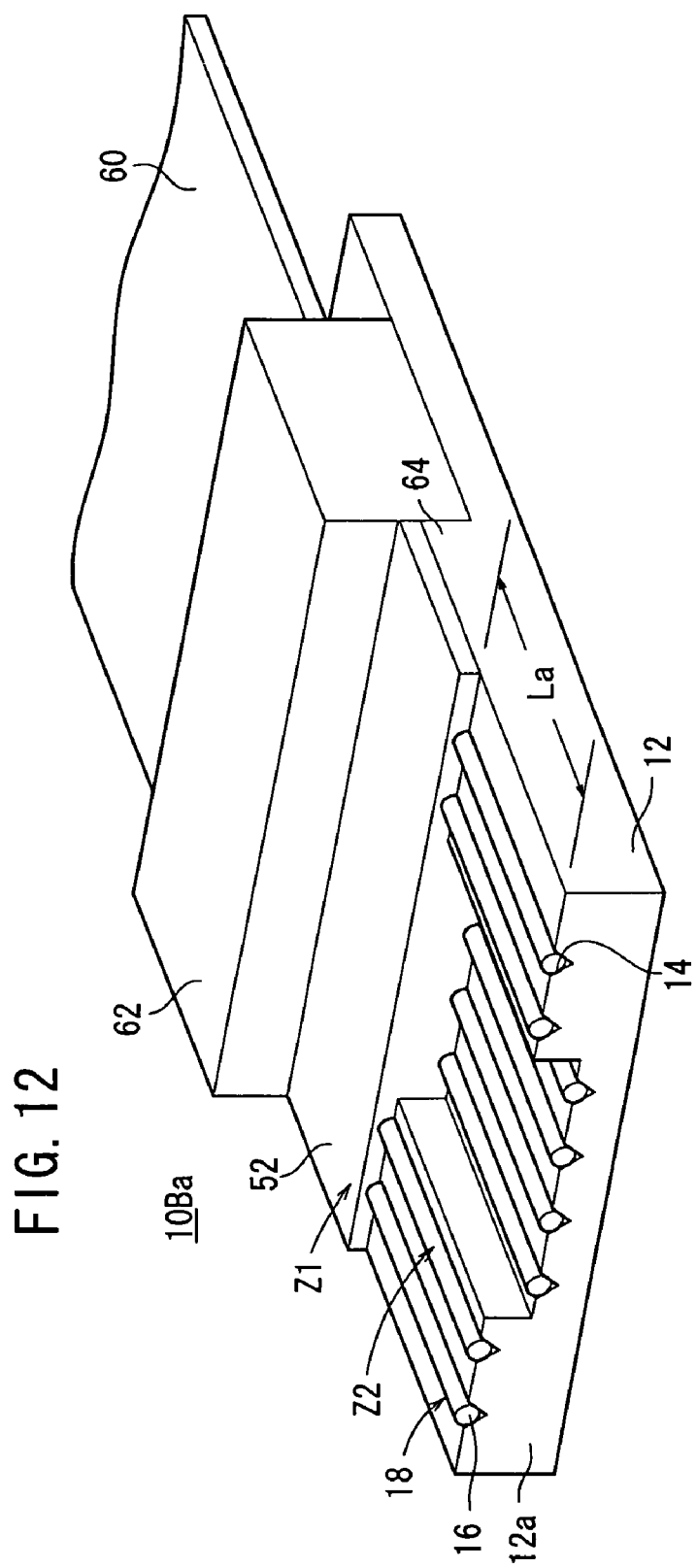
FIG. 12 is a perspective view of a modification of the optical device according to the second embodiment.
Figure 13:
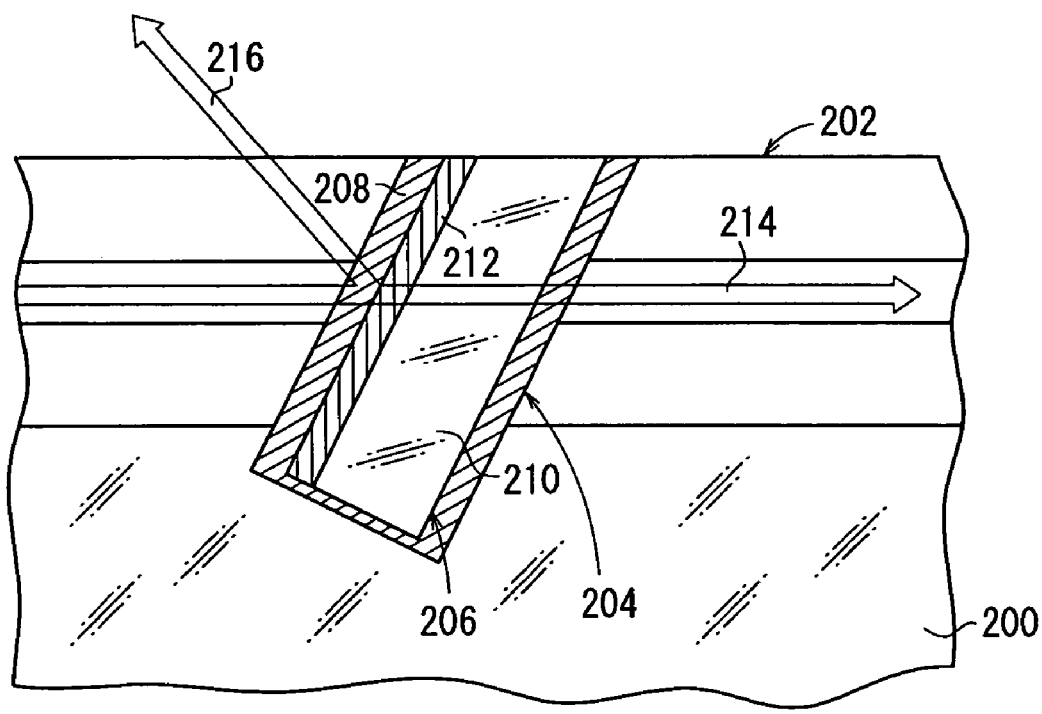
FIG. 13 is a fragmentary cross-sectional view of a conventional optical device.

In the optical device 10B according to the second embodiment described above, the optical fibers 16 of the optical fiber array 18 are arranged laterally in a side-by-side array. FIG. 12 shows another optical device 10Ba, according to a modification thereof, in which some of the optical fibers 16 are arrayed in vertically displaced positions.

An example of the optical device 10A according to the first embodiment shall be described below. First, a glass substrate 12, for use in the optical device according to this example, was fabricated by grinding.

The glass substrate 12 was made of borosilicate glass, and in particular, was formed from Pyrex (registered trademark) glass. The glass substrate 12 had a length of 16 mm and a thickness of 1 mm. Twelve V-shaped grooves 14, for placement of the optical fiber array 18, were formed by grinding at a pitch of 250 µm and a depth of about 90 µm.

Then, the optical fiber array 18 was assembled. The optical fiber array 18 comprised a 12-core ribbon fiber assembly having a pitch of 250 µm. A tape was peeled off from the 12-core ribbon fiber assembly to provide a peeled region having a length of 12 mm, and the optical fibers were placed within the V-shaped grooves 14 in the glass substrate 12. Thereafter, a holding down jig 54 was placed on the optical fiber array 18. At this time, the optical fiber array 18 was pressed against and fixed within the V-shaped grooves 14 by the holding down jig 54, using a non-illustrated weighting jig or the like.

The holding down jig 54 was made from a material (e.g., polytetrafluoroethylene or PTFE) that does not adhere to the fixing adhesive 52 (e.g., an epoxy-based ultraviolet-curable adhesive), which was to be applied later. The holding down jig 54 had a window 56 defined vertically through a central portion thereof, e.g., a window 56 having an elongate rectangular shape as viewed from above, as shown in FIG. 5.

Then, the fixing adhesive (ultraviolet-curable adhesive) 52 was applied from longitudinally opposite sides of the holding down jig 54. At this time, the fixing adhesive 52 entered along the lower surface of the holding down jig 54 as a result of a capillary action. However, because of the window 56 of the holding down jig 54, further entry of the fixing adhesive 52 was effectively stopped at the window 56, and the fixing adhesive 52 did not creep over the optical fiber array 18 directly below the window 56.

Thereafter, ultraviolet radiation was applied from above to tentatively secure the assembly. Once the assembly was tentatively secured, the reverse surface of the optical fiber array 18 (i.e., the reverse surface of the glass substrate 12) was irradiated with ultraviolet radiation. The holding down jig 54 was removed, and ultraviolet radiation was applied from above (to the upper surface of the optical fiber array 18), finally curing the fixing adhesive 52 with heat. During this stage, the first area Z1, with the fixing adhesive 52 present therein, and the second area Z2, with no fixing adhesive 52 present therein, were formed simultaneously on the optical fiber array 18.

Thereafter, a slit 20 was formed in the second area Z2 of the optical fiber array 18, in which the fixing adhesive 52 was not disposed. The slit 20 had a width of 30 μm, a depth of 20 μm, and a tilt angle α of 20°.

Subsequently, the filter member 22 was fabricated. The filter member 22 included a substrate of quartz glass. A multilayer film for dividing light was formed on the substrate of quartz glass. The multilayer film was designed for dividing light by 7%, and had a multilayer structure made up of quartz, tantalum oxide, and alumina. Thereafter, the filter member 22 was inserted into the slit 20, and the gap between the slit 20 and the filter member 22 was filled with a high-polymer gel material. The high-polymer gel material comprised a silicone-based high-polymer gel.

Thereafter, a PD array 30 was mounted on the submount 32. The PD array 30 had 12 channels, and was of a structure for detecting light applied to its reverse side.

Then, the PD array 30 (i.e., the PD array as mounted on the submount 32) was installed on the optical fiber array 18 with the refractive index matching resin 38 interposed therebetween. During mounting thereof, the PD array 30 was adjusted for central alignment while the refractive index matching resin 38 was being applied. At this time, the second area Z2 was filled with the refractive index matching resin 38, thereby preventing the refractive index matching resin 38 from flowing out.

The PD array 30 was aligned by active alignment, in order to maximize the power of the divided light 26 detected by the PD array 30 (i.e., the power of the divided light 26 detected by the active layer 28 corresponding to the channels at opposite ends of the optical fiber array 18), while light was applied to the channels at opposite ends of the optical fiber array 18. Following this stage, fabrication of the optical device according to the example was completed, and the completed optical device was packaged into a product.

The optical device was measured and evaluated. The polarization dependency of the divided light exhibited a good value of less than 0.3 dB, and variation of light-detecting efficiency due to temperature changes also exhibited a good value of 0.2 dB. Long-term reliability of the device was tested in a moisture-heat testing environment, at a temperature of 85° C. and a humidity of 85%. The optical device still exhibited good characteristics after elapse of 1000 hours in the moisture-heat test.

The optical devices according to the present invention and the method of manufacturing the same are not limited to the above embodiments, but various other arrangements could be envisaged and employed without departing from the essence of the present invention.

What is claimed is:

1. An optical device comprising:
    a photodetector;
    a substrate having one or more V-shaped grooves defined therein;
    an optical fiber array having one or more optical fibers, said optical fiber array being fixed within the V-shaped grooves in said substrate by a fixing adhesive, and having an end face that performs a dividing function for dividing signal light propagated through the optical fiber array;
    wherein at least a first area in which said fixing adhesive is present and a second area corresponding to an opening defined by a hold down jig in which said fixing adhesive is not present, are present on said optical fiber array as viewed from above such that said second area is present at least within an optical path of divided light produced by said dividing function over said optical fiber array;
    said optical device further comprising a resin for achieving refractive index matching with at least said optical fibers, said resin being present in said second area located above said optical fiber array and on said optical path of divided light between said optical fibers and said photodetector.

2. An optical device according to claim 1, wherein at least an end face of said second area and an end face of said optical fiber array are substantially aligned with each other.

3. An optical device according to claim 1, wherein said second area is surrounded by said first area.

4. An optical device according to claim 1, wherein an internal portion of said optical fiber array performs a dividing function for dividing signal light propagated through the optical fiber array, and said second area is present at least within an optical path of divided light produced by said dividing function over said optical fiber array.

5. An optical device according to claim 1, wherein said second area as viewed from above comprises a shape having axial symmetry with respect to a central line of said optical fiber array.

6. An optical device according to claim 5, wherein said second area has a substantially constant length entirely over said optical fiber array and along an optical axis of said optical fiber array.

7. An optical device according to claim 1, wherein said second area has different lengths in portions thereof along an optical axis of said optical fiber array.

8. An optical device according to claim 7, wherein said second area has different lengths associated respectively with said optical fibers along the optical axis of said optical fiber array.

9. A method of manufacturing an optical device, wherein said optical device includes a substrate having one or more V-shaped grooves defined therein, and an optical fiber array having one or more optical fibers, said optical fiber array being fixed within the V-shaped grooves in said substrate by a fixing adhesive, said method comprising:
    a first step of placing said optical fiber array within the V-shaped grooves in said substrate;
    a second step of placing a holding down jig, having a window in a portion thereof, on said optical fiber array;
    a third step of introducing said fixing adhesive between said holding down jig, said optical fiber array, and said V-shaped grooves; and
    a fourth step of, after said holding down jig is removed, introducing a resin that is different from said fixing adhesive into an area on said optical fiber array in which entry of said fixing adhesive was inhibited by the window of said holding down jig.

10. A method according to claim 9, wherein said fourth step comprises a step of introducing a resin for achieving refractive index matching with at least said optical fiber array into the area in which entry of said fixing adhesive was inhibited by the window of said holding down jig.

11. A method according to claim 9, further comprising:
a fifth step of forming a slit in a portion of said optical fiber array which corresponds to the area in which entry of said fixing adhesive was inhibited by the window of said holding down jig; and
a sixth step of inserting a dividing member into said slit, wherein said fifth step and said sixth step occur between said third step and said fourth step.

12. A method of manufacturing an optical device, wherein said optical device includes a substrate having one or more V-shaped grooves defined therein, and an optical fiber array having one or more optical fibers, said optical fiber array being fixed in the V-shaped grooves in said substrate by a fixing adhesive, said method comprising:
a first step of placing said optical fiber array in the V-shaped grooves in said substrate;
a second step of placing a holding down jig on said optical fiber array with an end face thereof being exposed;
a third step of introducing said fixing adhesive into a first area between said holding down jig, said optical fiber array, and said V-shaped grooves; a fourth step of removing said hold down jig; and
a fifth step of introducing a refractive index matching layer into a second area corresponding to an opening defined by said hold down jig.

* * * * *